US009359737B2

(12) United States Patent
Seo

(10) Patent No.: US 9,359,737 B2
(45) Date of Patent: Jun. 7, 2016

(54) ENVIRONMENTALLY-FRIENDLY SAFE WEIR COMPRISING BOTH WATER WAY AND FISHWAY

(71) Applicant: Moon Jin Seo, Mokpo-si (KR)

(72) Inventor: Moon Jin Seo, Mokpo-si (KR)

( * ) Notice: Subject to any disclaimer, the term of this patent is extended or adjusted under 35 U.S.C. 154(b) by 0 days.

(21) Appl. No.: 14/427,623

(22) PCT Filed: Sep. 2, 2013

(86) PCT No.: PCT/KR2013/007881
§ 371 (c)(1),
(2) Date: Mar. 11, 2015

(87) PCT Pub. No.: WO2014/051267
PCT Pub. Date: Apr. 3, 2014

(65) Prior Publication Data
US 2015/0247300 A1    Sep. 3, 2015

(30) Foreign Application Priority Data
Sep. 27, 2012    (KR) .......................... 10-2012-0107902

(51) Int. Cl.
*E02B 1/00*    (2006.01)
*E02B 8/08*    (2006.01)
*E02B 7/18*    (2006.01)
*E02B 8/00*    (2006.01)

(52) U.S. Cl.
CPC ................. *E02B 8/085* (2013.01); *E02B 1/006* (2013.01); *E02B 7/18* (2013.01); *E02B 8/00* (2013.01); *E02B 8/08* (2013.01)

(58) Field of Classification Search
CPC ............. E02B 1/006; E02B 7/18; E02B 8/00; E02B 8/08; E02B 8/085
USPC ......................................... 405/81–83
See application file for complete search history.

(56) References Cited

U.S. PATENT DOCUMENTS 1,380,384 A  *  6/1921  Howard .................. E02B 8/085
                                                          405/83
2,059,927 A  *  11/1936  Beck .................... A01K 63/006
                                                          119/250

(Continued)

FOREIGN PATENT DOCUMENTS

JP       2009-287208 A    12/2009
KR      10-1046036 B1      7/2011

(Continued)

*Primary Examiner* — Benjamin Fiorello
(74) *Attorney, Agent, or Firm* — Novick, Kim & Lee, PLLC; Jae Youn Kim

(57) ABSTRACT

Disclosed herein is an environmentally-friendly safety weir with both a waterway and a fishway. The safety weir includes a waterway pipe (100), a fishway pipe (200), and a control unit (300). The waterway pipe includes: a horizontal waterway pipe (110) that is provided on an embankment; a vertical waterway pipe (120) that extends from each of opposite ends of the horizontal waterway pipe downward; a bottom waterway pipe (130) that horizontally extends from the vertical waterway pipe outward; and a water entering-and-exiting pipe (140) that extends from the bottom waterway pipe upward. The fishway pipe is provided on the waterway pipe and is configured such that the level of water in the fishway pipe is controlled by adjusting the amount of air in the fishway pipe. The control unit includes: a first air supply pipe that is connected to the waterway pipe; and a second air supply pipe that communicates with the fishway pipe.

22 Claims, 11 Drawing Sheets

(56) References Cited

U.S. PATENT DOCUMENTS

| | | | | |
|---|---|---|---|---|
| 2,626,505 | A * | 1/1953 | Date | E02B 8/085 405/82 |
| 2,959,184 | A * | 11/1960 | Mahan | E02B 7/18 137/141 |
| 3,232,060 | A * | 2/1966 | Windle | E02B 8/085 405/83 |
| 3,575,004 | A * | 4/1971 | Gachne | E02B 7/18 137/132 |
| 3,783,623 | A * | 1/1974 | Ogden | E02B 8/085 405/82 |
| 4,629,361 | A * | 12/1986 | Zimmerman | E02B 8/08 405/81 |
| 5,660,499 | A * | 8/1997 | Bethune | E02B 8/085 405/83 |
| 2003/0039512 | A1 * | 2/2003 | Bethune | E02B 7/18 405/75 |
| 2010/0170236 | A1 * | 7/2010 | Lezi | E02B 8/00 60/398 |
| 2012/0148344 | A1 * | 6/2012 | Seo | E02B 8/085 405/81 |

FOREIGN PATENT DOCUMENTS

| | | | |
|---|---|---|---|
| KR | 10-2011-0126093 | A | 11/2011 |
| KR | 10-1144263 | B1 | 5/2012 |

* cited by examiner

ENVIRONMENTALLY-FRIENDLY SAFE WEIR COMPRISING BOTH WATER WAY AND FISHWAY

TECHNICAL FIELD

The present invention generally relates to weirs that are installed on embankments and provided with fishways. More particularly, the present invention relates to an environmentally-friendly safety weir provided with both a waterway and a fishway so that there is no need for installation of a separate water gate, and fish can easily and safely move over an embankment.

BACKGROUND ART

Generally, embankments are installed in rivers to block a river and maintain the amount and level of water in an upstream side constant and are provided with a water gate to allow a desired amount of water to flow to the downstream side. Thus, the embankments can prevent a variety of damage caused by water, for example, flooding, and make it possible for blocked water to be used as water for agricultural or industrial use or for living.

However, such an embankment is installed across a river to block the flow of water, thereby impeding upstream or downstream movement of various kinds of fish that depend on a variation in their seasonal inhabited environment. Thus, the aquatic ecosystems between the upstream side and the downstream of the river are disconnected from each other. Particularly, leptocephali, which are the larvae of eels, are an endangered species that move in groups to the upstream side of a river along the bottom of the river in the spring. If there is an embankment in the river, it blocks the movement of leptocephali. Due to this, leptocephali are easily eaten by predators. Consequently, there is a problem of a rapid reduction in the population of eels.

Moreover, embankments impede the flow of lower-layer water that is disposed around the bottom of a river, whereby river water may become excessively contaminated, or algae may be excessively created. Consequently, water quality deteriorates and, particularly, contamination of the bottom of the river is increased. As such, existing embankments have a problem in that they cause destruction of the environment.

In addition, if a separate water gate is installed in an embankment, it may distort the normal flow of a river because water gates are typically disposed at positions at which maintenance and management thereof can be easily conducted. Thereby, a river-bed scouring phenomenon is caused, and a danger of collapse of the embankment is increased. Furthermore, the performance of flood control is limited, so there are problems in maintenance and management.

Of course, various styles of fishways through which fish can move may be formed in embankments. For example, a safety fishway that makes it possible for fish to safely move or flee was proposed in Korean Patent Registration No. 10-1046036. This safety fishway includes: an intake and exhaust valve 7; a horizontal pipe 2 provided with a transparent window 6; inclined pipes 3 that extend downward from the horizontal pipe 2 at a predetermined angle relative to the horizontal pipe 2; extension pipes 4 that horizontally extend the respective inclined pipes 3; entering-and-exiting pipes 5 that extend upward from the respective extension pipes 4; and covers 8 that cover the respective entering-and-exiting pipes 5.

However, in the above-described conventional safety fishway 1, the performance thereof is limited depending on a difference in height between the inclined pipes disposed on opposite sides of the embankment D, a difference in water level, and an angle of inclination of each inclined pipe. Thus, it may be difficult for fish to easily move through the fishway 1. Furthermore, the conventional safety fishway 1 is open, so that not only fry or small fish that are weak in swimming force but also large carnivorous fish can easily enter the safety fishway 1. Therefore, the conventional safety fishway 1 cannot provide a safe shelter for fry or small fish.

Furthermore, the conventional safety fishway 1 may further include a water gate that discharges stored water to control the level or quantity of water. However, only upper-layer water that has been newly drawn in is discharged. Thus, the bottom of a river is gradually contaminated. Because water cannot circulate vertically, algae may be excessively created, thus causing a red tide phenomenon, thereby further deteriorating the water quality environment.

Moreover, the conventional safety fishway 1 is hazardous to leptocephali, which are an endangered species all over the world, in that they cannot move to the upstream side and they may be swept away in strong water currents or eaten by predators entering the fishway. Therefore, the conventional safety fishway 1 cannot solve a fundamental problem of a rapid reduction in the population of eels.

DISCLOSURE

Technical Problem

Accordingly, the present invention has been made keeping in mind the above problems occurring in the prior art, and an object of the present invention is to provide an environmentally-friendly safety weir with both a waterway and a fishway that is installed on an embankment and configured such that the level or quantity of water can be easily controlled only by adjusting the amount of air occupying the space in a pipe without using a separate water gate, and in which a waterway pipe is installed such that it makes contact with the bottom of a river, so that lower-layer water can be discharged along with a variety of contaminants including heavy metal material, thereby purifying the river and improving water quality conditions, and in which an underwater stairway is installed inside or outside a fishway pipe so that fish can easily move, particularly, even during a period of water shortage, and the stairway can function as a safe shelter for fish.

Another object of the present invention is to provide an environmentally-friendly safety weir that can prevent distortion of a waterway unlike that caused by a conventional water gate installed on an embankment and can prevent torrent or eddy currents, whereby there is no possibility of collapse of the embankment attributable to a river-bed scouring phenomenon, and which can restore the flow of the river over the entire area of the embankment to the normal state, whereby sandbars, islands, rapids, etc. can be created in the river in a similar shape as that of a natural river, and which can integrate artificial water installations into one structure, thereby facilitating control of the level and quality of water, and improving the water quality environment.

A further object of the present invention is to provide an environmentally-friendly safety weir that makes it possible for leptocephali, which are endangered species, to safely move to the upstream side while avoiding strong water currents or predators, thus fundamentally solving a problem of a rapid reduction in the population of eels.

Yet another object of the present invention is to provide an environmentally-friendly safety weir that is configured such that when the safety weir is installed on a coast seawall, a large number of fry or leptocephali that attempt to move from the sea into a river can easily move into the river with the tidal current in flood tide via the safety weir installed on the seawall.

Technical Solution

In order to accomplish the above objects, in an aspect, the present invention provides an environmentally-friendly safety weir with both a waterway and a fishway, including: a waterway pipe having a horizontal waterway pipe horizontally provided on an embankment and connected to a first air supply pipe, the first air supply pipe provided for supplying air into the horizontal waterway pipe, a vertical waterway pipe extending from each of opposite ends of the horizontal waterway pipe downward along an outer side surface of the embankment, a bottom waterway pipe horizontally extending from an end of the vertical waterway pipe outward, the bottom waterway pipe being placed at a bottom of a body of water, and a water entering-and-exiting pipe extending from an end of the bottom waterway pipe upward so that water is drawn into or out of the waterway pipe through the water entering-and-exiting pipe; a fishway pipe provided on the waterway pipe and communicating with a second air supply pipe, the second air supply pipe provided for supplying air into the fishway pipe, the fishway pipe being configured such that a level of water in the fishway pipe is adjusted by increasing or reducing an amount of air in the fishway pipe; and a control unit having the first air supply pipe passing through the fishway pipe and connected to the waterway pipe, with a first intake-and-exhaust valve provided on the first air supply pipe, the first intake-and-exhaust valve controlling an increase or reduction in an amount of air in the waterway pipe, and the second air supply pipe communicating with the fishway pipe, with a second intake-and-exhaust valve provided on the second air supply pipe, the second intake-and-exhaust valve controlling an increase or reduction in an amount of air in the fishway pipe.

In another aspect, the present invention provides an environmentally-friendly safety weir with both a waterway and a fishway, including: a waterway pipe having a horizontal waterway pipe horizontally provided on an embankment and connected to a first air supply pipe, the first air supply pipe provided for supplying air into the horizontal waterway pipe, a vertical waterway pipe extending from each of opposite ends of the horizontal waterway pipe downward along an outer side surface of the embankment, a bottom waterway pipe horizontally extending from an end of the vertical waterway pipe outward, the bottom waterway pipe being placed at a bottom of a body of water, and a water entering-and-exiting pipe extending from an end of the bottom waterway pipe upward so that water is drawn into or out of the waterway pipe through the water entering-and-exiting pipe; a fishway pipe provided on the waterway pipe and communicating with a second air supply pipe, the second air supply pipe provided for supplying air into the fishway pipe, the fishway pipe being configured such that a level of water in the fishway pipe is adjusted by increasing or reducing an amount of air in the fishway pipe; a control unit having the first air supply pipe passing through the fishway pipe and connected to the waterway pipe, with a first intake-and-exhaust valve provided on the first air supply pipe, the first intake-and-exhaust valve controlling an increase or reduction in an amount of air in the waterway pipe, and the second air supply pipe communicating with the fishway pipe, with a second intake-and-exhaust valve provided on the second air supply pipe, the second intake-and-exhaust valve controlling an increase or reduction in an amount of air in the fishway pipe; and an internal underwater stairway provided in each of opposite sides of the fishway pipe, the internal underwater stairway comprising a plurality of stepped units vertically stacked on top of one another.

In a further aspect, the present invention provides an environmentally-friendly safety weir with both a waterway and a fishway, including: a waterway pipe having a horizontal waterway pipe horizontally provided on an embankment and connected to a first air supply pipe, the first air supply pipe provided for supplying air into the horizontal waterway pipe, a vertical waterway pipe extending from each of opposite ends of the horizontal waterway pipe downward along an outer side surface of the embankment, a bottom waterway pipe horizontally extending from an end of the vertical waterway pipe outward, the bottom waterway pipe being placed at a bottom of a body of water, and a water entering-and-exiting pipe extending from an end of the bottom waterway pipe upward so that water is drawn into or out of the waterway pipe through the water entering-and-exiting pipe; a fishway pipe provided on the waterway pipe and communicating with a second air supply pipe, the second air supply pipe provided for supplying air into the fishway pipe, the fishway pipe being configured such that a level of water in the fishway pipe is adjusted by increasing or reducing an amount of air in the fishway pipe; a control unit having the first air supply pipe passing through the fishway pipe and connected to the waterway pipe, with a first intake-and-exhaust valve provided on the first air supply pipe, the first intake-and-exhaust valve controlling an increase or reduction in an amount of air in the waterway pipe, and the second air supply pipe communicating with the fishway pipe, with a second intake-and-exhaust valve provided on the second air supply pipe, the second intake-and-exhaust valve controlling an increase or reduction in an amount of air in the fishway pipe; and an external underwater stairway disposed outside the fishway pipe and connected to each of opposite sides of the fishway pipe, the external underwater stairway comprising a plurality of stepped units vertically stacked on top of one another, the external underwater stairway being configured to communicate with upper and lower parts of the fishway pipe.

In yet another aspect, the present invention provides an environmentally-friendly safety weir with both a waterway and a fishway, including: a waterway pipe having a horizontal waterway pipe horizontally provided on an embankment and connected to a first air supply pipe, the first air supply pipe provided for supplying air into the horizontal waterway pipe, a vertical waterway pipe extending from each of opposite ends of the horizontal waterway pipe downward along an outer side surface of the embankment, a bottom waterway pipe horizontally extending from an end of the vertical waterway pipe outward, the bottom waterway pipe being placed at a bottom of a body of water, and a water entering-and-exiting pipe extending from an end of the bottom waterway pipe upward so that water is drawn into or out of the waterway pipe through the water entering-and-exiting pipe; a fishway pipe provided on the waterway pipe and communicating with a second air supply pipe, the second air supply pipe provided for supplying air into the fishway pipe, the fishway pipe being configured such that a level of water in the fishway pipe is adjusted by increasing or reducing an amount of air in the fishway pipe; a control unit having the first air supply pipe passing through the fishway pipe and connected to the waterway pipe, with a first intake-and-exhaust valve provided on the first air supply pipe, the first intake-and-exhaust valve controlling an increase or reduction in an amount of air in the waterway pipe, and the second air supply pipe communicating with the fishway pipe, with a second intake-and-exhaust valve provided on the second air supply pipe, the second intake-and-exhaust valve controlling an increase or reduction in an amount of air in the fishway pipe; an internal underwater stairway provided in each of opposite sides of the fishway pipe, the internal underwater stairway comprising a plurality of stepped units vertically stacked on top of one another; and an external underwater stairway disposed outside the fishway pipe and connected to each of the opposite sides of the fishway pipe, the external underwater stairway comprising a plurality of stepped units vertically stacked on top of one another, the external underwater stairway being configured to communicate with upper and lower parts of the fishway pipe.

Each of the stepped units may be open on an upper surface thereof and have a space for containing water therein, and the stepped units may be connected to each other to form a spiral shape.

Each of the stepped units may have a sectorial cross-section.

The external underwater stairway may include: a stairway housing having a hollow space therein, with the stepped units disposed in the stairway housing and stacked on top of one another to form a spiral shape; and communication pipes respectively connecting upper and lower ends of the stairway housing to the upper and lower parts of the fishway pipe.

The internal underwater stairway or the external underwater stairway may further include a movement guide plate extending along edges of the stepped units, wherein fry or small fish are able to move along the movement guide plate.

The movement guide plate may be made of any one selected from the group consisting of natural rubber, silicone, urethane, latex, and SBS rubber so that frictional force on the movement guide plate is increased to prevent fish from slipping on the movement guide plate.

The movement guide plate may include on a surface thereof a plurality of friction protrusions or depressions for preventing fish from slipping on the movement guide plate.

The movement guide plate may include therein a waved movement guide groove continuously extending in a longitudinal direction of the movement guide plate.

The movement guide plate may further include a plurality of umbrella-shaped protectors arranged in the longitudinal direction of the movement guide groove on both sides of the movement guide groove.

The protectors may be made of elastic material.

The movement guide plate may further include a plurality of shelters provided above the movement guide groove, each of the shelters protecting fish.

Each of the shelters may be hollow and have a hemispherical shape.

The water entering-and-exiting pipe may include a screen net installed in an upper end of the water entering-and-exiting pipe, the screen net having a plurality of passing holes therein.

A sensor or a monitoring camera may be installed around the water entering-and-exiting pipe so as to monitor whether foreign substances have accumulated on the water entering-and-exiting pipe.

The fishway pipe may include: a horizontal fishway pipe horizontally provided on the waterway pipe; a vertical fishway pipe communicating with the horizontal fishway pipe and extending downward from each of opposite ends of the horizontal fishway pipe; a bottom fishway pipe communicating with the vertical fishway pipe and horizontally extending from an end of the vertical fishway pipe outward, the bottom fishway pipe being disposed in a lower portion of the safety weir; and a fish entering-and-exiting pipe extending from an end of the bottom fishway pipe upward so that water and fish come into or out of the fishway pipe through the fish entering-and-exiting pipe.

The fish entering-and-exiting pipe may include in an upper end thereof a passing net having a plurality of passing holes through which fish come into or out of the fish entering-and-exiting pipe.

The fish entering-and-exiting pipe may include an auxiliary passing net installed in a sidewall of the fish entering-and-exiting pipe that is adjacent to the embankment, the auxiliary passing net having a plurality of passing holes.

The horizontal fishway pipe may have a swimming chamber formed by protruding a portion of a bottom of the horizontal fishway pipe so that fish can swim in the swimming chamber.

The horizontal fishway pipe may include an observation window through which an interior of the horizontal fishway pipe can be observed, and water-level graduations may be formed on or beside the observation window.

Advantageous Effects

An environmentally-friendly safety weir with both a waterway and a fishway according to the present invention is installed on an embankment and configured such that the level or quantity of water can be easily controlled only by adjusting the amount of air occupying the space in a pipe without using a separate water gate. A waterway pipe is installed such that it makes contact with the bottom of a river, so that lower-layer water can be discharged along with a variety of contaminants including heavy metal material, thereby purifying the river and improving water quality conditions. An underwater stairway is installed inside or outside a fishway pipe so that fish can easily move, particularly, even during a period of water shortage. Furthermore, the safety weir can provide a safe shelter for fish.

In addition, the environmentally-friendly safety weir can prevent distortion of a waterway unlike that caused by a conventional water gate installed on an embankment and can prevent torrent or eddy currents, whereby there is no possibility of collapse of the embankment attributable to a riverbed scouring phenomenon. The safety weir can restore the flow of the river over the entire area of the embankment to the normal state. Thereby, sandbars, islands, rapids, etc. can be created in the river in a similar shape as that of a natural river. Furthermore, the safety weir can integrate artificial water installations into one, thereby facilitating control of the level and quality of water. As a result, the water quality environment can be markedly improved.

Moreover, the environmentally-friendly safety weir that makes it possible for leptocephali, which are endangered species, to safely move to the upstream side while avoiding strong water currents or predators, thus fundamentally solving a problem of a rapid reduction in the population of eels.

Furthermore, when the safety weir is installed on a coast seawall, a large number of fry or leptocephali that attempt to move from the sea into a river can easily move into the river with the tidal current in a flood tide via the safety weir installed on the seawall.

BEST MODE

The inventor of the present invention recognized the problems of the conventional safety fishway in which: it is difficult for fish to easily move along the fishway because parts of the fishway that are disposed on opposite sides of an embankment are sharply inclined; the fishway has an open structure, and comparatively large carnivorous fish can thus easily enter the fishway, so that the fishway cannot provide a safe shelter for small fish; the fishway is provided with a water gate to forcibly discharge stored water as needed, wherein only upper-layer water that has been newly drawn in is discharged, so that the bottom of a river is gradually contaminated; because water cannot circulate vertically, algae may be excessively created, thus causing a red tide phenomenon, thereby further deteriorating the water quality environment. In an effort to overcome the above problems, the inventor proposes an environmentally-friendly safety weir with both a waterway and a fishway that is installed on an embankment and configured such that the level or quantity of water can be easily controlled only by adjusting the amount of air occupying the space in a pipe without using a separate water gate. In the safety weir, a waterway pipe is installed such that it makes contact with the bottom of a river, so that lower-layer water can be discharged along with a variety of contaminants including heavy metal material, thereby purifying the river and improving water quality conditions. In addition, an underwater stairway is installed inside or outside a fishway pipe so that fish can easily move, and the stairway can function as a safe shelter for fish.

Hereinafter, embodiment of the present invention will be described in detail with reference to the attached drawings.

Figure 1:
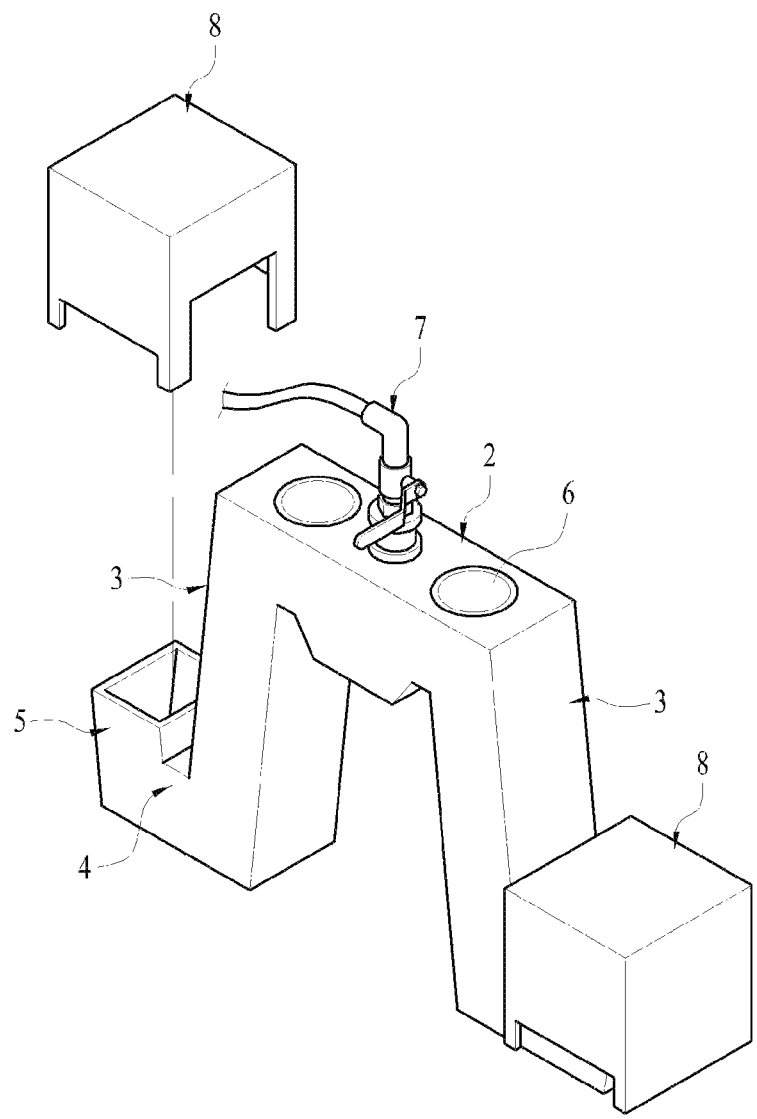
FIG. 1 is a perspective view showing the construction of a conventional safety fishway.
Figure 2:
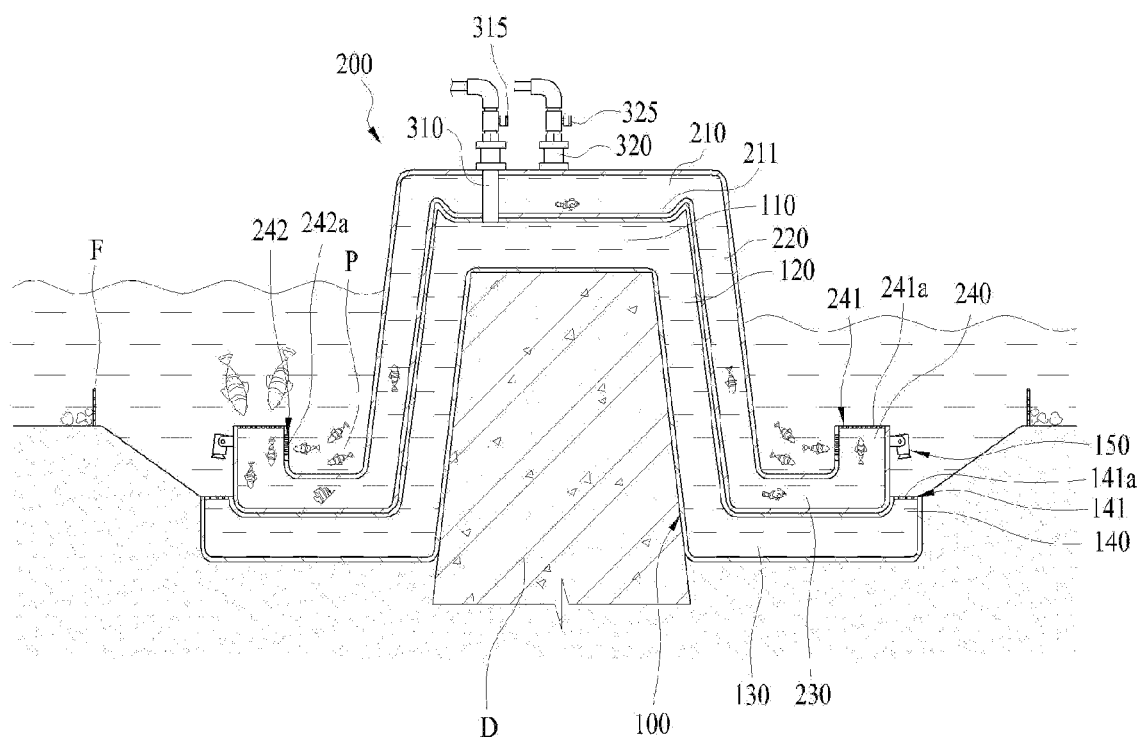
FIG. 2 is a front view illustrating a safety weir, according to an embodiment of the present invention.

Referring to FIG. 2, an environmentally-friendly safety weir 10 according to a first embodiment of the present invention includes a waterway pipe 100, a fishway pipe 200, and a control unit 300.

As shown in FIG. 2, the waterway pipe 100 is installed on an embankment D and communicates with a first air supply pipe 310 that is used to supply air into the waterway pipe 100. Lower-layer water that has been in one side the embankment D is drawn into the waterway pipe 100 and then discharged to the other side of the embankment D.

If the embankment D is installed in a river, the embankment D impedes the flow of lower-layer water that is on the bottom of the river, thus aggravating contamination of water around the bottom of the river. Even if a water gate is installed in the embankment D, only upper-layer water that is newly drawn in overflows the embankment D or flows through the water gate while contamination of the bottom of the river is exacerbated. In addition, because water does not circulate with respect to the vertical direction, water pollution is further exacerbated. However, in the present invention, the waterway pipe 100 is installed such that it is brought into contact with the bottom of the river. In this case, the level or quantity of water can be easily controlled only by adjusting the amount of air occupying the space in the waterway pipe 100 without using a separate water gate. Furthermore, lower-layer water along with various contaminants including heavy metals, etc. can be discharged through the waterway pipe 100 so that the river can be purified and the water quality environment can be improved.

The waterway pipe 100 includes a horizontal waterway pipe 110, vertical waterway pipes 120, bottom waterway pipes 130 and water entering-and-exiting pipes 140. Junctions between the pipes constituting the waterway pipe 100 are rounded so that water can smoothly flow.

The horizontal waterway pipe 110 is horizontally provided on the embankment D and has a pipe structure forming a water passage through which water can flow.

An observation window 112 is provided on the horizontal waterway pipe 110 so as to allow a user to observe the interior of the horizontal waterway pipe 110. Preferably, the observation window 112 is made of transparent material so that the user can observe conditions of the interior of the waterway pipe 110 through the observation window 112.

Furthermore, it is preferable that water-level graduations 113 are formed on or beside the observation window 112 to make it possible for the user to check the water level in the horizontal waterway pipe 110. Depending on the water level in the horizontal waterway pipe 110 that is checked by means of the water-level graduations 113, supply of water into the horizontal waterway pipe 110 or discharge of water therefrom can be determined.

The vertical waterway pipes 120 communicate with the horizontal waterway pipe 110 and are disposed on opposite sides of the embankment D. The vertical waterway pipes 120 extend from respective opposite ends of the horizontal waterway pipe 110 downwards. Depending on the shape of the embankment D, the orientation of the vertical waterway pipe 120 may be vertical or be inclined by a predetermined angle.

Each bottom waterway pipe 130 communicates with the corresponding vertical waterway pipe 120 and horizontally extends from a lower end of the vertical waterway pipe 120 outward. The bottom waterway pipes 130 are placed on the bottom of the river.

Each water entering-and-exiting pipe 140 extends upward from an outer end of the corresponding bottom waterway pipe 130 so that water is drawn into or discharged from the water entering-and-exiting pipe 140. The water entering-and-exiting pipe 140 allows comparatively large fish to come into or out thereof. The water entering-and-exiting pipe 140 is installed such that an inclined surface is formed between it and the bottom of the river.

A screen net 141 having a plurality of passing holes 141a is provided on an upper end of each water entering-and-exiting pipe 140, and only lower-layer water can be drawn into or discharged from the water entering-and-exiting pipe 140.

Preferably, a fence F is installed on a boundary of the inclined surface, thus preventing coarse gravel or large stones from coming onto the screen net 141 through the inclined surface and clogging the passing holes 141a.

Furthermore, a monitoring camera 150 is installed around each water entering-and-exiting pipe 140 so as to monitor whether foreign substances have accumulated on the water entering-and-exiting pipe 140. If excessive large gravel or foreign substances are piled on the water entering-and-exiting pipe 140, a pump (not shown) or the like is operated so that the gravel or foreign substances along with water can be removed therefrom.

The fishway pipe 200 is provided on the waterway pipe 100 and communicates with a second air supply pipe 320 that is used to supply air into the fishway pipe 200. The water level in the fishway pipe 200 can be controlled by adjusting the amount of air occupying the space in the fishway pipe 200.

Generally, steep slopes are formed on the opposite surfaces of the embankment D. Thus, it is difficult for fish to move from one side of the embankment D to the other side of the embankment D. Particularly, given the fact that there may be comparatively carnivorous fish, it is not safe for small fish because they cannot easily move over the embankment D. However, the fishway pipe 200 is configured such that the water level therein can be easily appropriately controlled by adjusting the amount of air occupying the space in the fishway pipe 200, whereby fish can easily move over the embankment, and the fishway pipe 200 can function as a safe haven for fish.

The fishway pipe 200 includes a horizontal fishway pipe 210, vertical fishway pipes 220, bottom fishway pipes 230 and fish entering-and-exiting pipes 240. Junctions between the pipes constituting the fishway pipe 200 are rounded so that water can smoothly flow.

The horizontal fishway pipe 210 is horizontally provided on the waterway pipe 100, in detail, on the horizontal waterway pipe 110. The horizontal fishway pipe 210 includes a swimming chamber 211 that is formed by protruding a portion of the bottom of the horizontal fishway pipe 210 downward such that fish can freely swim therein.

The swimming chamber 211 is a kind of pool and contains water therein so that even when the velocity of flow is very low, fish can move through the horizontal fishway pipe. In this way, the swimming chamber 211 enables fish to freely swim and provides a shelter for fish.

A drain hole that is openably closed by a stopper is formed in the bottom of the swimming chamber 211 so that water can be discharged out of the swimming chamber 211, as needed.

Furthermore, the horizontal fishway pipe 210 includes an observation window 212 allowing the user to observe the interior of the horizontal fishway pipe 210. Preferably, the observation window 212 is made of transparent material so that the user can observe conditions of the interior of the horizontal fishway pipe 210 through the observation window 212.

It is preferable that water-level graduations 213 are formed on or beside the observation window 212 to make it possible for the user to check the water level in the horizontal fishway pipe 210. Depending on the water level in the horizontal fishway pipe 210 that is checked by means of the water-level graduations 213, supply of water into the horizontal fishway pipe 210 or discharge of water therefrom can be determined.

The vertical fishway pipes 220 communicate with the horizontal fishway pipe 210 and respectively extend opposite ends of the horizontal fishway pipe 210 downward. Depending on the shape of the embankment D, the orientation of the vertical fishway pipes 220 may be vertical or be inclined by a predetermined angle.

Disposed in a lower portion of the weir, the bottom fishway pipes 230 each communicate with the corresponding vertical fishway pipe 220 and horizontally extend from a lower end of the vertical fishway pipe 220 outward.

Each fish entering-and-exiting pipe 240 extends upward from an outer end of the corresponding bottom fishway pipe 230 so that small fish along with water are allowed to come into or out of the fish entering-and-exiting pipe 240. Preferably, the fish entering-and-exiting pipe 240 is configured such that the height of the upper end of thereof is approximately level with the bottom of the river.

A passing net 241 having a plurality of passing holes 241a is provided on an upper end of each fish entering-and-exiting pipe 240 so that fish can come into or out of the fish entering-and-exiting pipe 240 through the passing holes 241a.

Meanwhile, fish instinctively find a place where the velocity of flow is comparatively low so that they can maintain a comfortable position where they can easily support themselves in water and can easily avoid natural enemies. Given this, a space is formed between each vertical fishway pipe 220 and the associated fish entering-and-exiting pipe 240, in other words, above the bottom fishway pipe 230, thus forming a fish place P where small fish can safely gather. Preferably, an auxiliary passing net 242 having a plurality of passing holes 242a is installed in a surface of the fish entering-and-exiting pipe 240 that is adjacent to the embankment D so that small fish that have gathered in the fish place P can easily come into and out of the fish entering-and-exiting pipe 240.

The passing holes 241a and 242a each are smaller than that of each passing hole 141a of the screen net 141 so as to allow only small fish to pass the passing hole 241a or 242a. Thereby, the fishway pipe 200 can function as a shelter for small fish in which comparatively large carnivorous fish cannot prey on small herbivorous fish.

The control unit 300 controls the level and quantity of water in the waterway pipe 100 and the fishway pipe 200. The control unit 300 includes a first air supply pipe 310 and a second air supply pipe 320. Control operation of the control unit 300 may be automatically conducted manually or by a control panel.

The first air supply pipe 310 is configured such that it passes through the fishway pipe 200 and communicates with the waterway pipe 100. The amount of air occupying the space in the waterway pipe 100 is controlled by means of a first intake-and-exhaust valve 315 provided on the first air supply pipe 310, whereby the level and quantity of water in the waterway pipe 100 can be adjusted.

In detail, the total volume of the space in the waterway pipe 100 that is filled with air and water, which are mutually exclusive, is always constant. The water entering-and-existing pipe 140 that is horizontally oriented is under constant atmospheric pressure. Therefore, the level and quantity of water in the waterway pipe 100 can be controlled by adjusting the amount of air in the waterway pipe 100 rather than adjusting water, which has a greater specific gravity than air.

When the amount of air in the waterway pipe 100 is reduced by operating an air pump (not shown), lower-layer water in the river is pushed by the atmospheric pressure and is drawn into the water entering-and-exiting pipes 140 that communicate with each other. Thereafter, the drawn lower-layer water is moved upward toward the horizontal waterway pipe 110 via the bottom waterway pipes 130 and the vertical waterway pipes 120 and then stored in the waterway pipe 100. When the first intake-and-exhaust valve 315 is opened, air is drawn into the waterway pipe 100 through the first air supply pipe 310, so that water that has been in the waterway pipe 100 can be rapidly discharged out of the waterway pipe 100.

The second air supply pipe 320 is connected to the fishway pipe 200. The amount of air occupying the space in the fishway pipe 200 is controlled by means of a second intake-and-exhaust valve 325 provided on the second air supply pipe 320, whereby the level and quantity of water in the fishway pipe 200 can be adjusted.

When the amount of air in the fishway pipe 200 is reduced by operating an air pump (not shown), lower-layer water in the river is pushed by atmospheric pressure and is drawn into the fish entering-and-exiting pipes 240 that communicate with each other. Thereafter, the drawn in lower-layer water is moved upward toward the horizontal fishway pipe 210 via the bottom fishway pipes 230 and vertical fishway pipes 220 and then stored in the fishway pipe 200. When the second intake-and-exhaust valve 325 is opened, air is drawn into the fishway pipe 200 through the second air supply pipe 320, so that water that is in the fishway pipe 200 can be rapidly discharged out of the fishway pipe 200.

An environmentally-friendly safety weir 10 with both a waterway and a fishway according to a second embodiment of the present invention includes a waterway pipe 100, a fishway pipe 200, a control unit 300 and an internal underwater stairway 400.

The constructions of the waterway pipe 100, the fishway pipe 200 and the control unit 300 are the same as those of the earlier embodiment.

Figure 4:
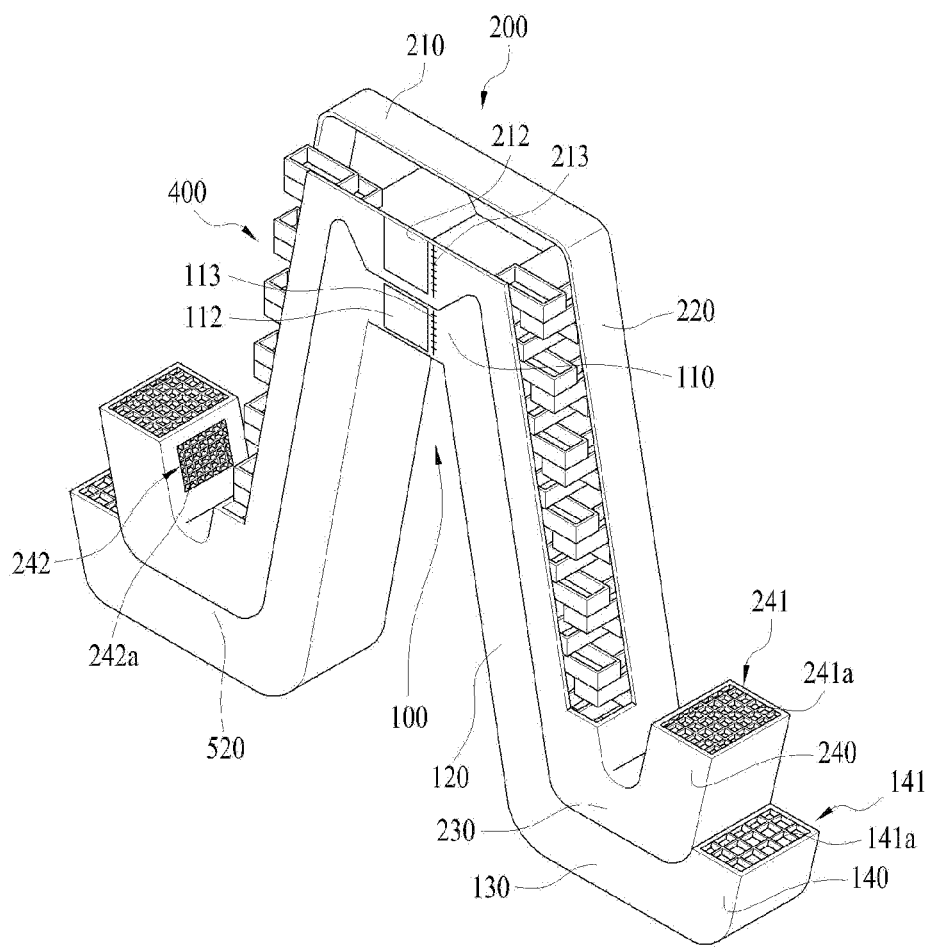
FIG. 4 is a view showing the construction of a safety weir with an internal stepped unit according to an embodiment of the present invention.

As shown in FIG. 4, the internal underwater stairway 400 is provided in each of the vertical fishway pipes 220 that are installed on opposite sides of the fishway pipe 200. The internal underwater stairway 400 includes a plurality of stepped units U that are vertically stacked on top of one another. Each stepped unit U is open on an upper surface thereof so that fish that enter the corresponding fishway pipe through the fish entering-and-exiting pipe 240 can move from the stepped unit U to another stepped unit U through the open upper surface thereof, and water can be contained in hollow space of the stepped unit U through the open upper surface thereof, whereby fish can easily move.

Furthermore, the stepped units U are connected to each other to have a spiral structure. Thereby, even when the fishway pipe 200 has comparatively small internal space, the stepped units U can be easily vertically installed in the fishway pipe 200.

Figure 3A:
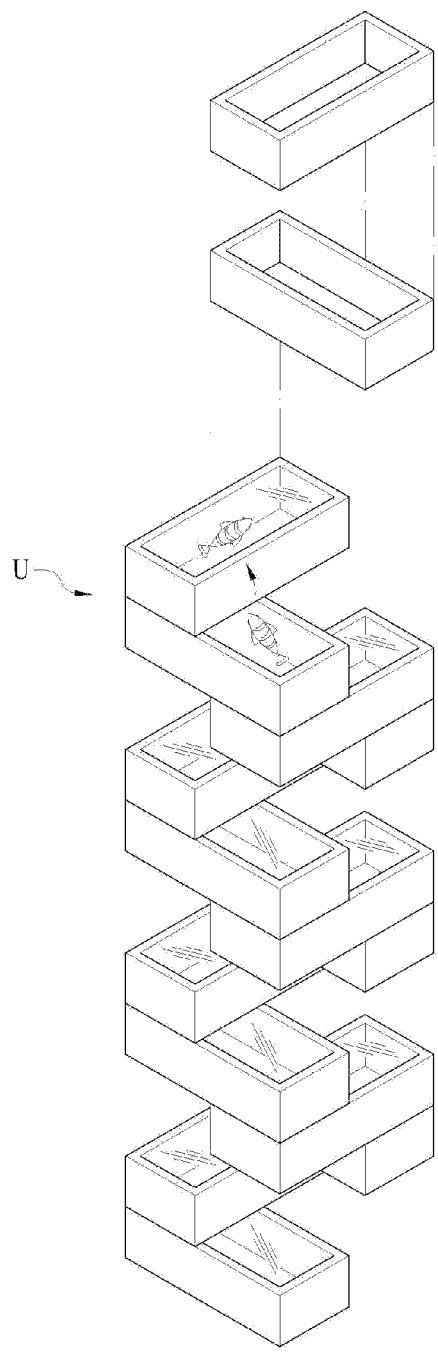
FIGS. 3a and 3b are views showing stepped units and stacked states thereof according to an embodiment of the present invention.

For example, as shown in FIG. 3a, each stepped unit U may have a rectangular parallelepiped shape with an open upper surface. In this case, the rectangular parallelepiped stepped units U are stacked on top of one another to have a substantial spiral shape in such a way an end of each stepped unit U is perpendicularly placed on an end of another stepped unit U.

Figure 3B:
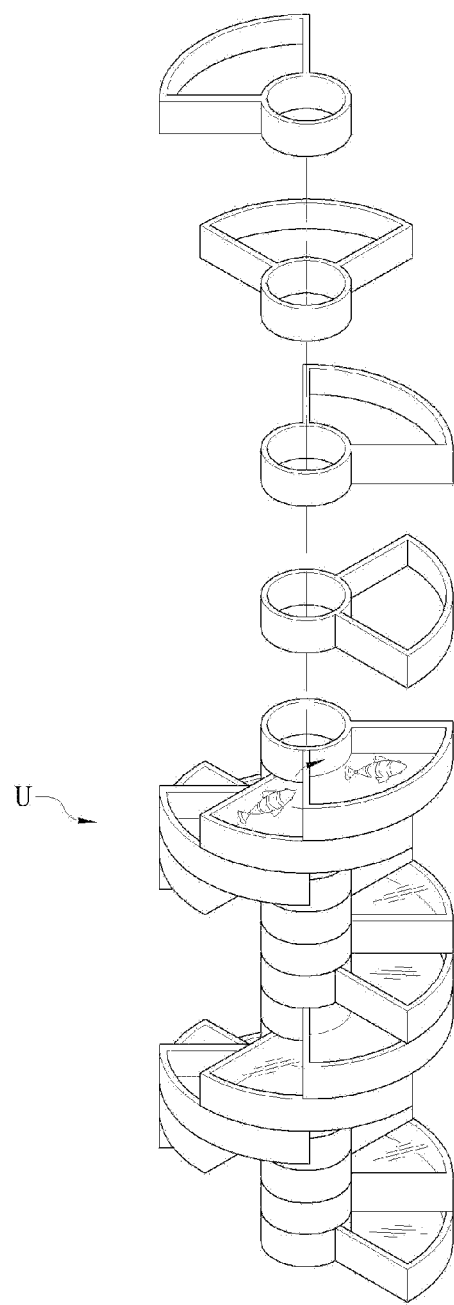

Alternatively, as shown in FIG. 3b, each stepped unit U may have a sectorial cross-section. In this case, a cylindrical support shaft is provided at a predetermined position. The stepped units U each are fitted at an end thereof over the support shaft and are stacked on top of one another to have a substantial spiral shape in such a way that each stepped unit U is spaced apart from adjacent stepped units U at a predetermined angular interval around the support shaft.

An environmentally-friendly safety weir 10 with both a waterway and a fishway according to a third embodiment of the present invention includes a waterway pipe 100, a fishway pipe 200, a control unit 300 and an external underwater stairway 500.

The constructions of the waterway pipe 100, the fishway pipe 200 and the control unit 300 are the same as those of the earlier embodiments.

Figure 5:
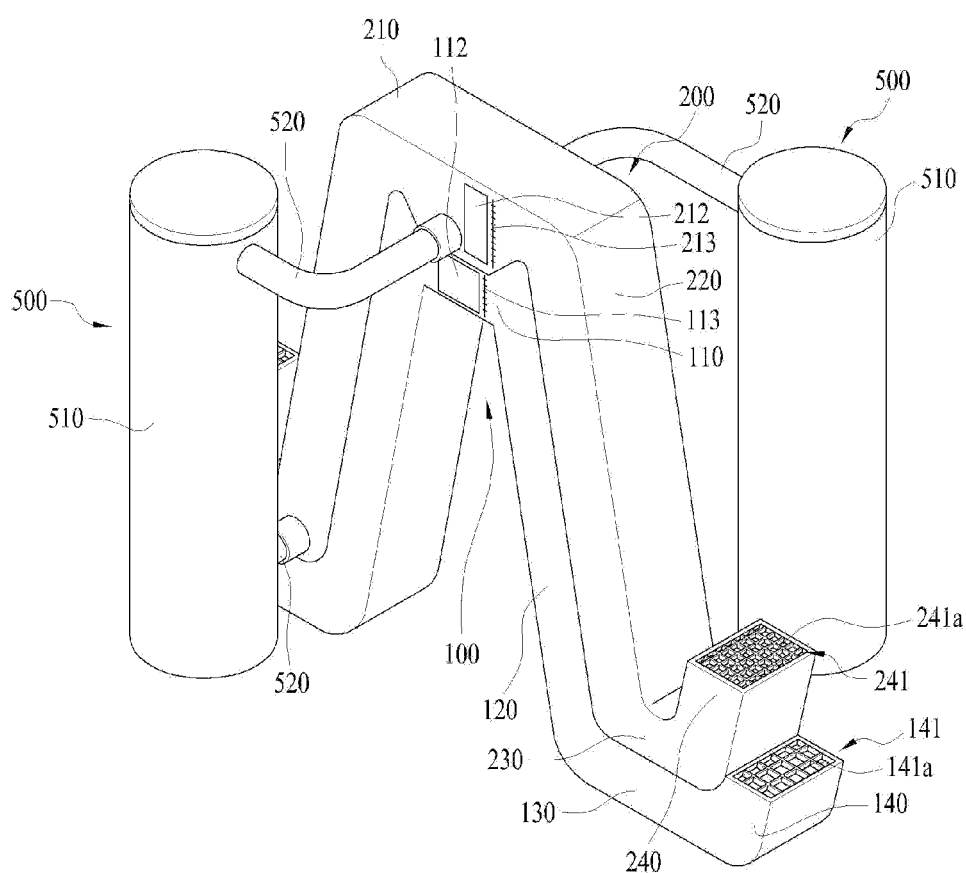
FIG. 5 is a view showing the construction of a safety weir with an external stepped unit according to an embodiment of the present invention.

As shown in FIG. 5, the external underwater stairway 500 is disposed outside the fishway pipe 200 and is provided on each of the opposite sides of the fishway pipe 200. The external underwater stairway 500 includes a plurality of stepped units U that are vertically stacked on top of one another. The external underwater stairway 500 is configured such that it communicates with upper and lower parts of the fishway pipe 200.

Since the embankment D can have a variety of shapes, the internal space of the fishway pipe 200 may be comparatively small. Thus, it may be difficult to stack the stepped units U on top of one another in the fishway pipe 200. In this case, it is preferable that the external underwater stairway 500 be used.

The external underwater stairway 500 includes a stairway housing 510 that has therein a hollow space, in which a plurality of stepped units U are stacked on top of one another in a spiral shape, and communication pipes 520 that respectively connect upper and lower parts of the stairway housing 510 to the upper and lower parts of the fishway pipe 200.

Therefore, fish that enter the fishway pipe 200 through any one of the fish entering-and-exiting pipes 240 enter the external underwater stairway 500 through the corresponding communication pipe 520. Thereafter, the fish move upward through the stepped units U that are stacked on top of one another in a spiral shape. The fish that reach the horizontal fishway pipe 210 may swim in the swimming chamber 211 or directly move to the other side and enter the other external underwater stairway 500 through the corresponding communication pipe 520 before moving downward through the stepped units U that are stacked on top of one another in a spiral shape. In this way, fish can move in a similar manner to that of ascending or descending along a river.

Figure 6A:
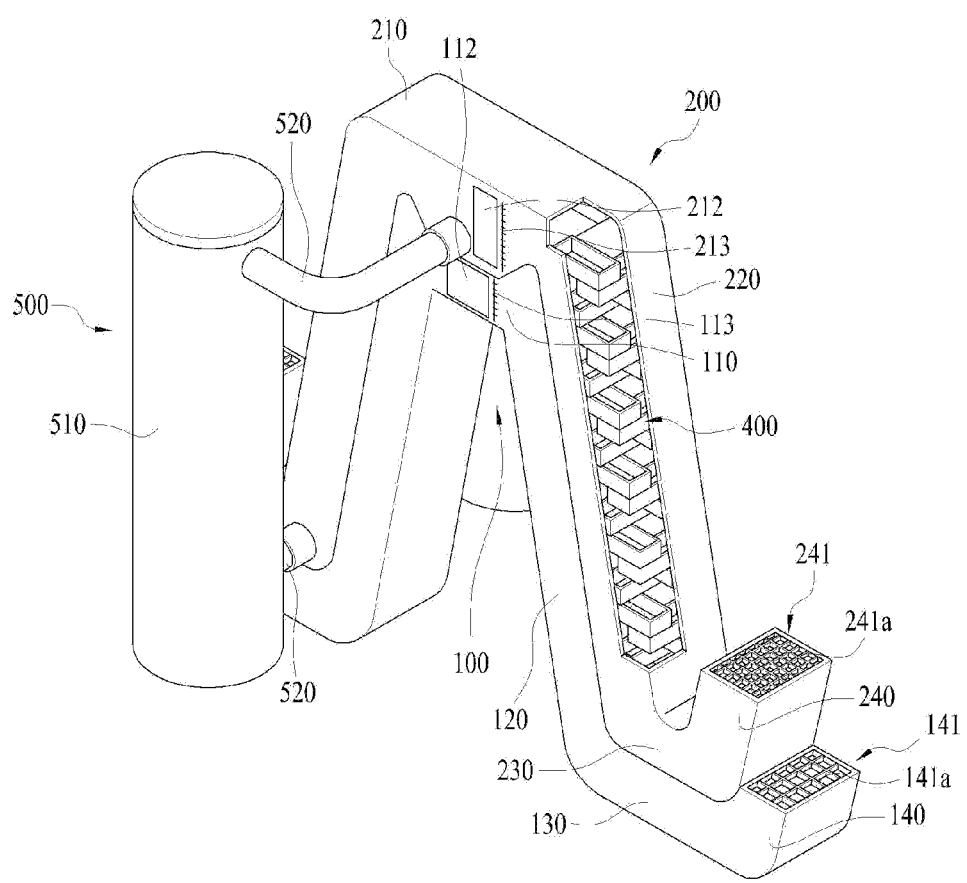
FIGS. 6a and 6b are views showing the construction of a safety weir with both an internal stepped unit and an external stepped unit according to an embodiment of the present invention.
Figure 6B:
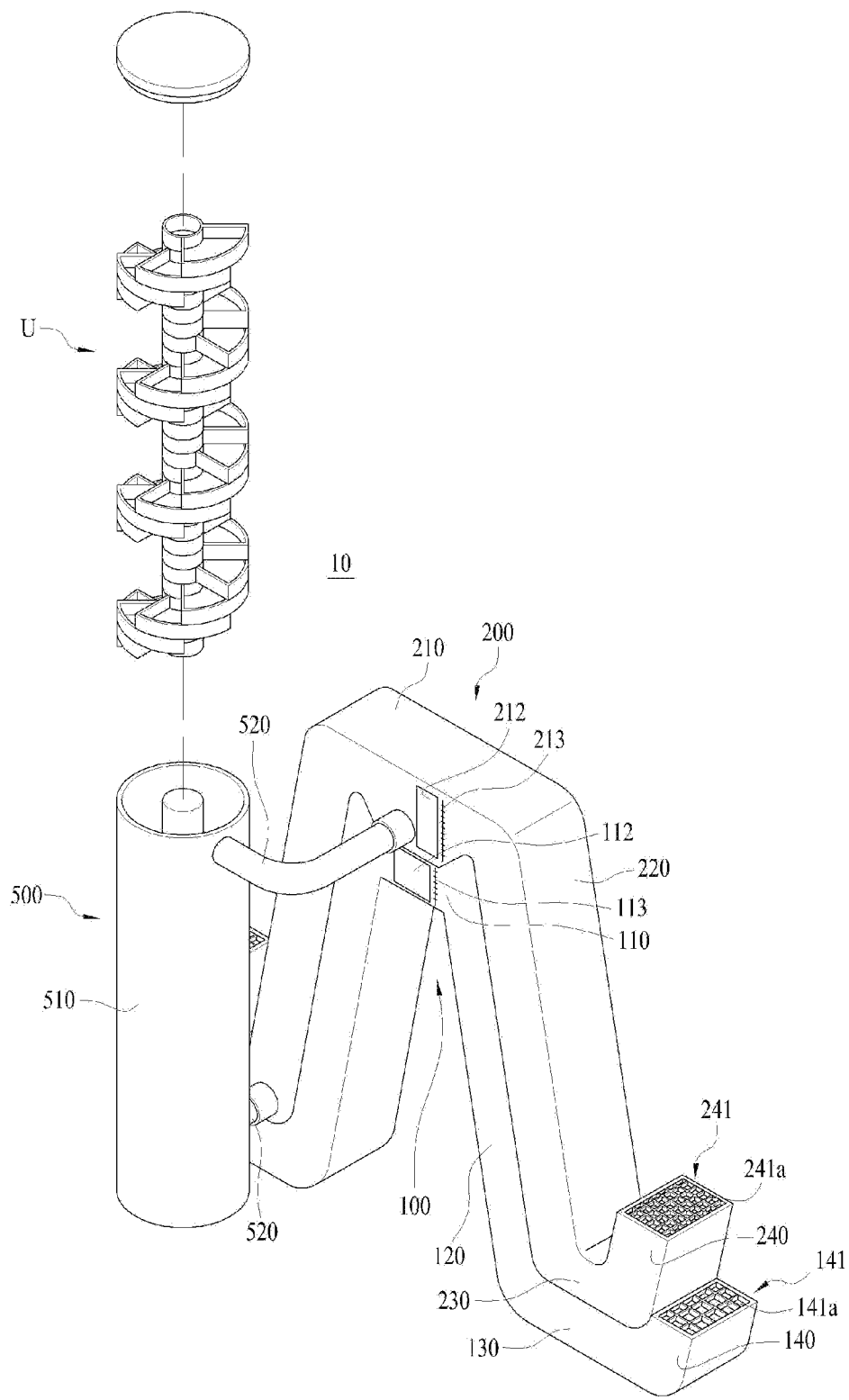

As shown in FIGS. 6a and 6b, an environmentally-friendly safety weir 10 with both a waterway and a fishway according to a fourth embodiment of the present invention includes a waterway pipe 100, a fishway pipe 200, a control unit 300, an internal underwater stairway 400 and an external underwater stairway 500.

In detail, the internal underwater stairway 400 is provided in one side of the fishway pipe 200 and includes a plurality of stepped units U that are vertically stacked on top of one another. The external underwater stairway 500 is provided outside the fishway pipe 200 at a position adjacent to the other side of the fishway pipe 200 and includes a plurality of stepped units U that are vertically stacked on top of one another. The external underwater stairway 500 is configured such that upper and lower ends thereof respectively communicate with the upper and lower parts of the fishway pipe 200.

Figure 7A:
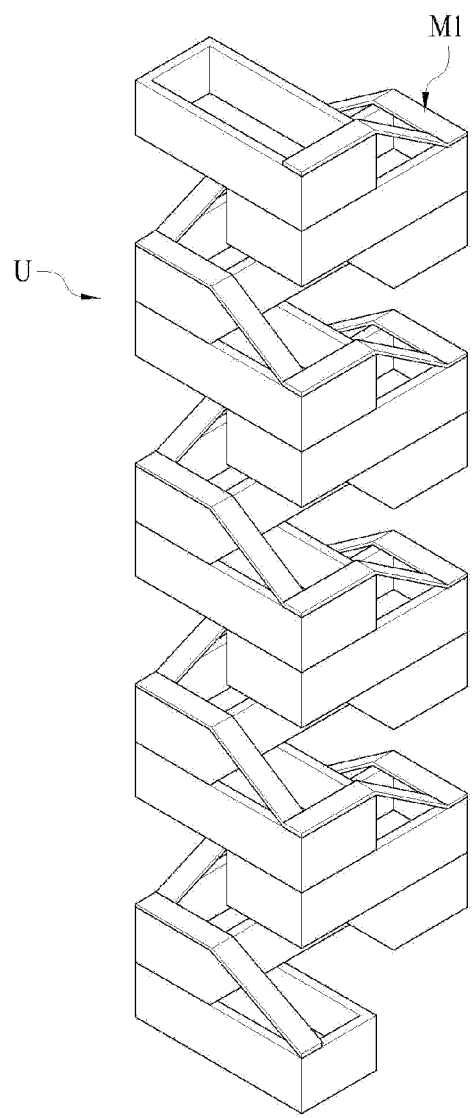
FIGS. 7a and 7b are views showing stepped units with moving plates and stacked states thereof according to an embodiment of the present invention.
Figure 7B:
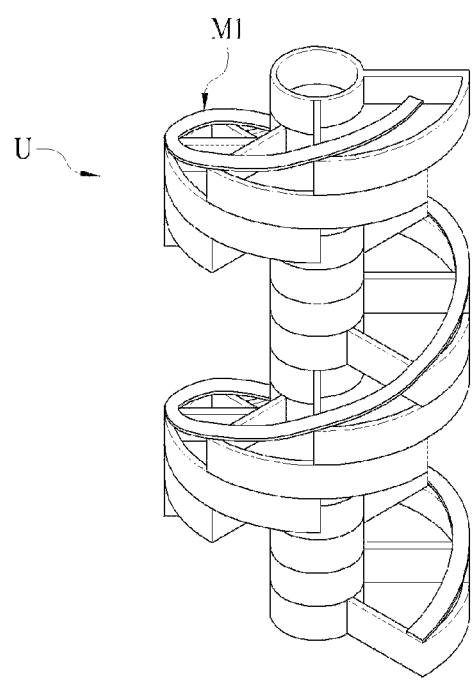

Meanwhile, as shown in FIGS. 7a and 7b, the internal underwater stairway 400 or the external underwater stairway 500 may further include a movement guide plate M1 that extends along outer edges of the stepped units U so that fry or small fish can easily move along the movement guide plate M1.

Particularly, the movement guide plate M1 makes it possible for leptocephali, which are an endangered species, to safely move to a midstream or upstream side of the river away from predators or rough currents. Preferably, the movement guide plate M1 is made of any one selected from the group consisting of natural rubber, silicone, urethane, latex, and SBS rubber to enable leptocephali ranging in size from 5 cm to 10 cm in length to move upward or downward while supporting themselves without slipping on the movement guide plate M1 without slipping.

More preferably, a plurality of friction protrusions or depressions are repeatedly formed on the surface of the movement guide plate M1 so as to prevent fish from slipping and enable fish to easily move in the reverse direction to the flow of water.

Figure 8:
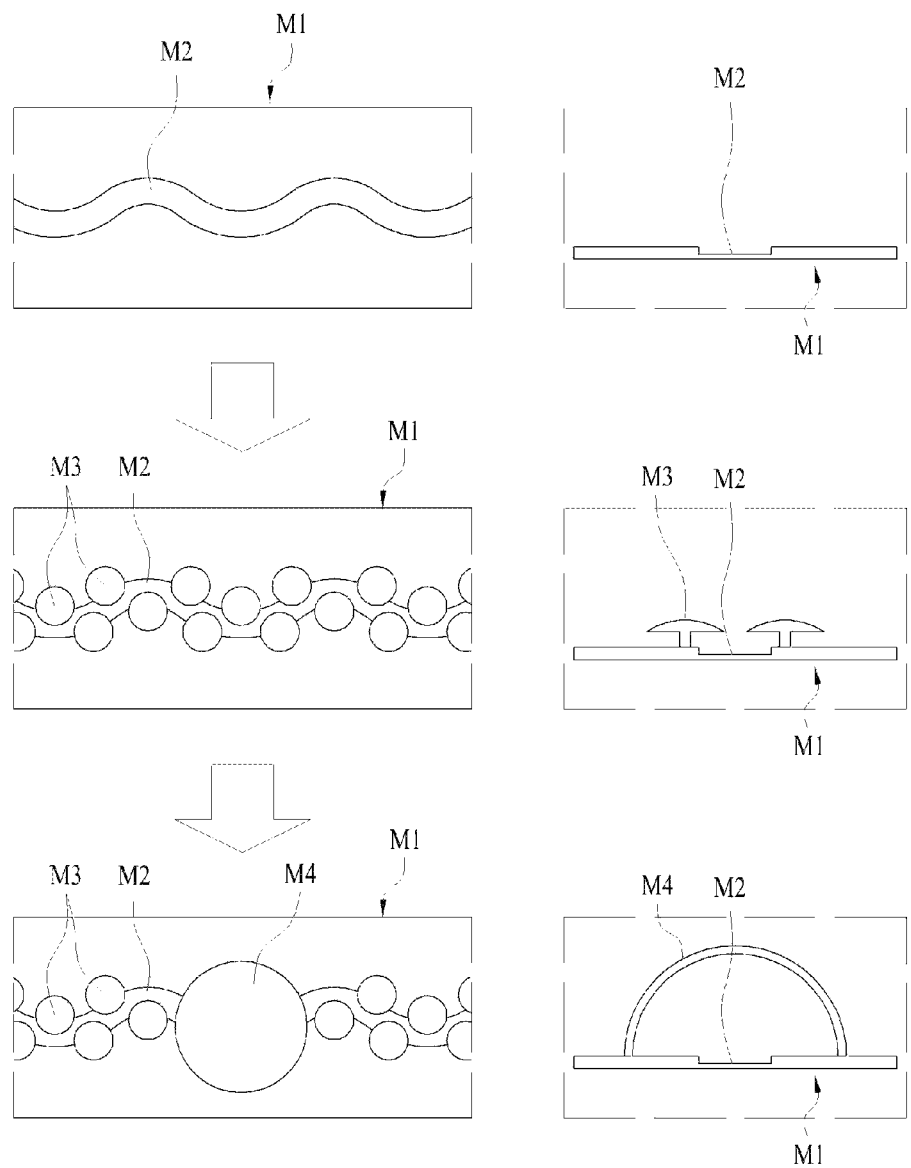
FIG. 8 illustrates the detailed constructions of moving plates according to embodiments of the present invention.

As shown in FIG. 8, having a continuous curved wave shape along the longitudinal direction of the movement guide plate M1, a movement guide groove M2 is formed in the movement guide plate M1. Leptocephali instinctively find a place where the velocity of flow is comparatively low, so that they can maintain a comfortable position and can easily support themselves in water, whereby they can easily avoid their natural enemies. The movement guide groove M2 functions to provide such a place.

Furthermore, the movement guide groove M2 reduces the velocity of the flow of water therein and increases a contact area between the movement guide plate and the body of a leptocephalus, thus increasing the force with which the leptocephalus supports itself in water, thereby enhancing the force with which the leptocephalus moves upstream on the inclined movement guide plate Ml.

Furthermore, a plurality of protectors M3 each having an umbrella shape are arranged in the longitudinal direction of the movement guide groove M2 on both sides of the movement guide groove M2, thus forming a shape like a forest. The protectors M3 function as roofs and thus protect fry or leptocephali. In addition, the protectors M3 function to separate a passage along which fry or leptocephali move from a passage along which comparatively large fish move.

In other words, fry or leptocephali can safely move in the space under the protectors M3 while avoiding notice or attack of predators. Larger fish can move above the protectors M3.

Each protector M3 is made of elastic material, e.g., natural rubber, silicone, urethane, latex, or SBS rubber, whereby leptocephali can be prevented from being injured by collision with the protectors M3 that may be caused while the leptocephali move along the movement guide groove, and leptocephali can bring a part of their body, such as a tail, into contact with the protectors M3 and thus use the elastic repulsive force of the protectors M3 to easily move forward or easily change direction.

Moreover, the movement guide plate M1 further includes a plurality of shelters M4 that are installed above the movement guide groove M2 at positions spaced apart from each other at regular intervals so that fish can take a rest while moving along the movement guide groove M2. Preferably, each shelter M4 has a hollow hemispherical shape. Fish in the shelters M4 can avoid attack of predators, and fry or leptocephali can avoid strong currents while moving and relieve fatigue of upstream or downstream movement.

If the safety weir according to the present invention is installed on a coast seawall, fry or leptocephali that attempt to move from the sea into a river can easily move into the river with the tidal current in flood tide via the safety weir installed on the seawall. Furthermore, movement and blocking of fry or leptocephali can be precisely controlled by adjusting the amount of air occupying the fishway pipe.

As described above, an environmentally-friendly safety weir 10 with both a waterway and a fishway according to the present invention is installed on an embankment. In the environmentally-friendly safety weir, the level or quantity of water in a pipe can be easily controlled by increasing or reducing the amount of air occupying the pipe without requiring installation of a separate water gate. Furthermore, a waterway pipe is installed such that it makes contact with the bottom of a river. Thus, lower-layer water rather than only upper-layer water can be discharged along with a variety of contaminants including heavy metal material, thereby purifying a river and improving water quality conditions. An underwater stairway is installed inside or outside the fishway pipe so that fish can easily move. In addition, the underwater stairway can provide a safe shelter for fish.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

A described above, an environmentally-friendly safety weir according to the present invention is installed on an embankment and is provided with both a waterway and a fishway without requiring installation of a separate water gate. Thus, fish not only can easily and safely move through the safety weir but water quality conditions can also be improved. Therefore, the industrial applicability of the present invention can be acknowledged.

The invention claimed is:

1. An environmentally-friendly safety weir with both a waterway and a fishway, comprising:
   a waterway pipe including:
      a horizontal waterway pipe horizontally provided on an embankment and connected to a first air supply pipe, the first air supply pipe provided for supplying air into the horizontal waterway pipe;
      a vertical waterway pipe extending from each of opposite ends of the horizontal waterway pipe downward along an outer side surface of the embankment;
      a bottom waterway pipe horizontally extending from an end of the vertical waterway pipe outward, the bottom waterway pipe being placed at a bottom of a body of water; and
      a water entering-and-exiting pipe extending from an end of the bottom waterway pipe upward so that water is drawn into or out of the waterway pipe through the water entering-and-exiting pipe;
   a fishway pipe provided on the waterway pipe and communicating with a second air supply pipe, the second air supply pipe provided for supplying air into the fishway pipe, the fishway pipe being configured such that a level of water in the fishway pipe is adjusted by increasing or reducing an amount of air in the fishway pipe; and
   a control unit including:
      the first air supply pipe passing through the fishway pipe and connected to the waterway pipe, with a first intake-and-exhaust valve provided on the first air supply pipe, the first intake-and-exhaust valve controlling an increase or reduction in an amount of air in the waterway pipe; and
      the second air supply pipe communicating with the fishway pipe, with a second intake-and-exhaust valve provided on the second air supply pipe, the second intake-and-exhaust valve controlling an increase or reduction in an amount of air in the fishway pipe.

2. The environmentally-friendly safety weir of claim 1, wherein the water entering-and-exiting pipe comprises:
   a screen net installed in an upper end of the water entering-and-exiting pipe, the screen net having a plurality of passing holes therein.

3. The environmentally-friendly safety weir of claim 1, wherein a sensor or a monitoring camera is installed around the water entering-and-exiting pipe so as to monitor whether foreign substances have accumulated on the water entering-and-exiting pipe.

4. The environmentally-friendly safety weir of claim 1, wherein the fishway pipe comprises:
   a horizontal fishway pipe horizontally provided on the waterway pipe;
   a vertical fishway pipe communicating with the horizontal fishway pipe and extending downward from each of opposite ends of the horizontal fishway pipe;
   a bottom fishway pipe communicating with the vertical fishway pipe and horizontally extending from an end of the vertical fishway pipe outward, the bottom fishway pipe being disposed in a lower portion of the safety weir; and a fish entering-and-exiting pipe extending from an end of the bottom fishway pipe upward so that water and fish come into or out of the fishway pipe through the fish entering-and-exiting pipe.

5. The environmentally-friendly safety weir of claim 4, wherein the fish entering-and-exiting pipe includes:

an auxiliary passing net installed in a sidewall of the fish entering-and-exiting pipe that is adjacent to the embankment, the auxiliary passing net having a plurality of passing holes.

6. The environmentally-friendly safety weir of claim 4, wherein the horizontal fishway pipe has:

a swimming chamber formed by protruding a portion of a bottom of the horizontal fishway pipe so that fish can swim in the swimming chamber.

7. The environmentally-friendly safety weir of claim 4, wherein the horizontal fishway pipe includes an observation window through which an interior of the horizontal fishway pipe can be observed, and water-level graduations are formed on or beside the observation window.

8. An environmentally-friendly safety weir with both a waterway and a fishway, comprising:

a waterway pipe including:

a horizontal waterway pipe horizontally provided on an embankment and connected to a first air supply pipe, the first air supply pipe provided for supplying air into the horizontal waterway pipe;

a vertical waterway pipe extending from each of opposite ends of the horizontal waterway pipe downward along an outer side surface of the embankment;

a bottom waterway pipe horizontally extending from an end of the vertical waterway pipe outward, the bottom waterway pipe being placed at a bottom of a body of water; and a water entering-and-exiting pipe extending from an end of the bottom waterway pipe upward so that water is drawn into or out of the waterway pipe through the water entering-and-exiting pipe;

a fishway pipe provided on the waterway pipe and communicating with a second air supply pipe, the second air supply pipe provided for supplying air into the fishway pipe, the fishway pipe being configured such that a level of water in the fishway pipe is adjusted by increasing or reducing an amount of air in the fishway pipe;

a control unit including:

the first air supply pipe passing through the fishway pipe and connected to the waterway pipe, with a first intake-and-exhaust valve provided on the first air supply pipe, the first intake-and-exhaust valve controlling an increase or reduction in an amount of air in the waterway pipe; and the second air supply pipe communicating with the fishway pipe, with a second intake-and-exhaust valve provided on the second air supply pipe, the second intake-and-exhaust valve controlling an increase or reduction in an amount of air in the fishway pipe; and an internal underwater stairway provided in each of opposite sides of the fishway pipe, the internal underwater stairway comprising a plurality of stepped units vertically stacked on top of one another.

9. The environmentally-friendly safety weir of claim 2, wherein each of the stepped units is open on an upper surface thereof and has a space for containing water therein, and the stepped units are connected to each other to form a spiral shape.

10. The environmentally-friendly safety weir of claim 9, wherein each of the stepped units has a sectorial cross-section.

11. The environmentally-friendly safety weir of claim 2, wherein the internal underwater stairway or the external underwater stairway further comprises a movement guide plate extending along edges of the stepped units, wherein fry or small fish are able to move along the movement guide plate.

12. The environmentally-friendly safety weir of claim 11, wherein the movement guide plate is made of any one selected from the group consisting of natural rubber, silicone, urethane, latex, and SBS rubber so that frictional force on the movement guide plate is increased to prevent fish from slipping on the movement guide plate.

13. The environmentally-friendly safety weir of claim 11, wherein the movement guide plate includes on a surface thereof a plurality of friction protrusions or depressions for preventing fish from slipping on the movement guide plate.

14. The environmentally-friendly safety weir of claim 11, wherein the movement guide plate includes therein a waved movement guide groove continuously extending in a longitudinal direction of the movement guide plate.

15. The environmentally-friendly safety weir of claim 14, wherein the movement guide plate further includes a plurality of umbrella-shaped protectors arranged in the longitudinal direction of the movement guide groove on both sides of the movement guide groove.

16. The environmentally-friendly safety weir of claim 15, wherein the protectors are made of elastic material.

17. The environmentally-friendly safety weir of claim 14, wherein the movement guide plate further includes a plurality of shelters provided above the movement guide groove, each of the shelters protecting fish.

18. The environmentally-friendly safety weir of claim 17, wherein each of the shelters is hollow and has a hemispherical shape.

19. The environmentally-friendly safety weir of claim 17, wherein the fish entering-and-exiting pipe includes in an upper end thereof a passing net having a plurality of passing holes through which fish come into or out of the fish entering-and-exiting pipe.

20. An environmentally-friendly safety weir with both a waterway and a fishway, comprising:

a waterway pipe including:

a horizontal waterway pipe horizontally provided on an embankment and connected to a first air supply pipe, the first air supply pipe provided for supplying air into the horizontal waterway pipe;

a vertical waterway pipe extending from each of opposite ends of the horizontal waterway pipe downward along an outer side surface of the embankment;

a bottom waterway pipe horizontally extending from an end of the vertical waterway pipe outward, the bottom waterway pipe being placed at a bottom of a body of water; and a water entering-and-exiting pipe extending from an end of the bottom waterway pipe upward so that water is drawn into or out of the waterway pipe through the water entering-and-exiting pipe;

a fishway pipe provided on the waterway pipe and communicating with a second air supply pipe, the second air supply pipe provided for supplying air into the fishway pipe, the fishway pipe being configured such that a level of water in the fishway pipe is adjusted by increasing or reducing an amount of air in the fishway pipe;

a control unit including:
the first air supply pipe passing through the fishway pipe and connected to the waterway pipe, with a first intake-and-exhaust valve provided on the first air supply pipe, the first intake-and-exhaust valve controlling an increase or reduction in an amount of air in the waterway pipe; and the second air supply pipe communicating with the fishway pipe, with a second intake-and-exhaust valve provided on the second air supply pipe, the second intake-and-exhaust valve controlling an increase or reduction in an amount of air in the fishway pipe; and an external underwater stairway disposed outside the fishway pipe and connected to each of opposite sides of the fishway pipe, the external underwater stairway comprising a plurality of stepped units vertically stacked on top of one another, the external underwater stairway being configured to communicate with upper and lower parts of the fishway pipe.

21. The environmentally-friendly safety weir of claim 20, wherein the external underwater stairway comprises:
a stairway housing having a hollow space therein, with the stepped units disposed in the stairway housing and stacked on top of one another to form a spiral shape; and
communication pipes respectively connecting upper and lower ends of the stairway housing to the upper and lower parts of the fishway pipe.

22. An environmentally-friendly safety weir with both a waterway and a fishway, comprising:
a waterway pipe including:
a horizontal waterway pipe horizontally provided on an embankment and connected to a first air supply pipe, the first air supply pipe provided for supplying air into the horizontal waterway pipe;
a vertical waterway pipe extending from each of opposite ends of the horizontal waterway pipe downward along an outer side surface of the embankment;
a bottom waterway pipe horizontally extending from an end of the vertical waterway pipe outward, the bottom waterway pipe being placed at a bottom of a body of water; and
a water entering-and-exiting pipe extending from an end of the bottom waterway pipe upward so that water is drawn into or out of the waterway pipe through the water entering-and-exiting pipe;
a fishway pipe provided on the waterway pipe and communicating with a second air supply pipe, the second air supply pipe provided for supplying air into the fishway pipe, the fishway pipe being configured such that a level of water in the fishway pipe is adjusted by increasing or reducing an amount of air in the fishway pipe;

a control unit including:
the first air supply pipe passing through the fishway pipe and connected to the waterway pipe, with a first intake-and-exhaust valve provided on the first air supply pipe, the first intake-and-exhaust valve controlling an increase or reduction in an amount of air in the waterway pipe; and the second air supply pipe communicating with the fishway pipe, with a second intake-and-exhaust valve provided on the second air supply pipe, the second intake-and-exhaust valve controlling an increase or reduction in an amount of air in the fishway pipe;

an internal underwater stairway provided in each of opposite sides of the fishway pipe, the internal underwater stairway comprising a plurality of stepped units vertically stacked on top of one another; and an external underwater stairway disposed outside the fishway pipe and connected to each of the opposite sides of the fishway pipe, the external underwater stairway comprising a plurality of stepped units vertically stacked on top of one another, the external underwater stairway being configured to communicate with upper and lower parts of the fishway pipe.

\* \* \* \* \*